(12) United States Patent
Schwalm et al.

(10) Patent No.: US 10,001,026 B2
(45) Date of Patent: Jun. 19, 2018

(54) IN-LINE SHUTOFF VALVES

(71) Applicant: Hamilton Sundstrand Corporation, Charlotte, NC (US)

(72) Inventors: Gregory K. Schwalm, Avon, CT (US); Gary M. McBrien, S. Glastonbury, CT (US)

(73) Assignee: Hamilton Sunstrand Corporation, Charlotte, NC (US)

( * ) Notice: Subject to any disclaimer, the term of this patent is extended or adjusted under 35 U.S.C. 154(b) by 140 days.

(21) Appl. No.: 15/159,268

(22) Filed: May 19, 2016

(65) Prior Publication Data

US 2017/0342853 A1 Nov. 30, 2017

(51) Int. Cl.
*F16K 1/12* (2006.01)
*F01D 17/14* (2006.01)
(Continued)

(52) U.S. Cl.
CPC ............ *F01D 17/145* (2013.01); *F01D 25/12* (2013.01); *F04D 27/009* (2013.01); *F16K 1/12* (2013.01); *F16K 1/126* (2013.01); *F16K 17/02* (2013.01); *F16K 31/04* (2013.01); *F16K 49/005* (2013.01); *F16K 49/007* (2013.01); *F01D 17/105* (2013.01); *F05D 2220/32* (2013.01); *Y10T 137/3367* (2015.04); *Y10T 137/6579* (2015.04)

(58) Field of Classification Search
CPC .......... F16K 1/12; F16K 1/126; F16K 49/007; Y10T 137/3367; Y10T 137/6579
See application file for complete search history.

(56) References Cited

U.S. PATENT DOCUMENTS 1,070,693 A * 8/1913 Keiser .................. F16K 49/007
                                                                                      122/6.5
2,204,724 A * 6/1940 Cope ..................... F16K 49/007
                                                                                      137/340
(Continued)

FOREIGN PATENT DOCUMENTS

DE              55632 C       3/1891
EP        0066795 A1      12/1982
(Continued)

OTHER PUBLICATIONS

The extended European search report dated Oct. 18, 2017, received from the European Patent Office for European Application No. EP17171948.

*Primary Examiner* — Kevin Murphy
(74) *Attorney, Agent, or Firm* — Locke Lord LLP; Scott D. Wofsy; Christopher J. Cillié

(57) ABSTRACT

An in-line shutoff valve includes a valve body with an inlet chamber, an outlet chamber, and a poppet seat disposed between the inlet and outlet chambers. A poppet is movably disposed within the valve body and has an open and closed position. The poppet seats against the poppet seat in the closed position, fluidly separating the inlet chamber from the outlet chamber. The poppet is unseated from the poppet seat in the open position, fluidly coupling the inlet and outlet chambers. A manifold with a servo port and a vent port is disposed within the valve body between the inlet and outlet chambers, the vent port being in fluid communication with the servo port to cool valve internal structures when the poppet is in the closed position.

19 Claims, 6 Drawing Sheets

(51) Int. Cl.

| | |
|---|---|
| *F16K 17/02* | (2006.01) |
| *F16K 31/04* | (2006.01) |
| *F16K 49/00* | (2006.01) |
| *F01D 25/12* | (2006.01) |
| *F04D 27/00* | (2006.01) |
| *F01D 17/10* | (2006.01) |

(56) References Cited

U.S. PATENT DOCUMENTS

| | | | | |
|---|---|---|---|---|
| 2,446,196 | A * | 8/1948 | Sitney | B63H 21/32 |
| | | | | 137/340 |
| 2,575,875 | A * | 11/1951 | Johnson | F16K 49/007 |
| | | | | 137/340 |
| 2,994,338 | A * | 8/1961 | Wilson | F16K 49/007 |
| | | | | 137/340 |
| 3,259,143 | A * | 7/1966 | Powell | F16K 49/007 |
| | | | | 137/340 |
| 3,540,464 | A | 11/1970 | Renzi | |
| 3,710,810 | A * | 1/1973 | Shiraki | F16K 49/007 |
| | | | | 137/1 |
| 3,831,622 | A * | 8/1974 | Grewer | F16K 49/007 |
| | | | | 137/340 |
| 4,169,488 | A * | 10/1979 | Goloff | F01L 3/18 |
| | | | | 123/188.3 |
| 2013/0199615 | A1 * | 8/2013 | McHugh | F16K 49/005 |
| | | | | 137/1 |

FOREIGN PATENT DOCUMENTS

| | | | |
|---|---|---|---|
| EP | 1635097 | A1 | 3/2006 |
| FR | 2871212 | A1 | 12/2005 |
| GB | 843317 | A | 8/1960 |

* cited by examiner

IN-LINE SHUTOFF VALVES

FEDERAL RESEARCH STATEMENT

This invention was made with government support with the United States Air Force under Contract No. FA8650-09-D-2929. The government has certain rights in the invention.

BACKGROUND OF THE INVENTION

1. Field of the Invention

The present disclosure relates to pressure regulating devices, and more particularly to in-line shutoff valves for bleed passages in gas turbine engines.

2. Description of Related Art

A variety of devices require a pressurized fluid in order to function properly. For example, secondary aircraft systems such as environmental control systems and anti-ice systems often require an input supply of high temperature and pressure gas. Sources of pressurized gas, for example, are present in the compressor of a gas turbine engine. In some gas turbine engines the gas available from compressor may approach temperatures where materials forming flow-regulating structures begin to exhibit material properties changes. For example, bleed flows may be sufficiently hot to reduce the strength of the material or increase the creep rate of the material for a given stress. Accordingly, it can be necessary to decrease the allowable stress budget for certain structures or to add material to the structure to accommodate the change in material properties associated with hot gas exposure. Heat conduction structures like fins can also be added to the structure to provide a conduction path for removal of heat from the structure.

Such conventional methods and systems have generally been considered satisfactory for their intended purpose. However, there is a need in the art for improved cooling of pressurized gas-conveying components in gas turbine engines since the trend in engine development is for operating temperatures and pressure to increase as engine development progresses, pushing the limits of available materials. The present disclosure provides a solution for this need.

SUMMARY OF THE INVENTION

An in-line shutoff valve includes a valve body with an inlet chamber, an outlet chamber, and a poppet seat disposed between the inlet and outlet chambers. A poppet is movably disposed within the valve body and has an open and a closed position. The poppet seats against the poppet seat in the closed position, fluidly separating the inlet chamber from the outlet chamber. The poppet is unseated from the poppet seat in the open position, fluidly coupling the inlet chamber with the outlet chamber. A manifold with a servo port and a vent port is disposed within the valve body between the inlet and outlet chambers, the vent port being in fluid communication with the servo port to cool valve internal structures when the poppet is in the closed position.

In certain embodiments, the poppet can have a poppet passage configured to selectively couple the servo port with the vent port according to position of the poppet. The poppet can extend about a longitudinal axis of the valve body. The poppet passage can extend radially through the poppet relative to the longitudinal axis of the valve body. A check valve can be seated in the poppet passage and arranged to fluidly separate the vent port from the servo port when pressure at the servo port exceed pressure at the vent port. A relief valve can be seated in the poppet passage and arranged to fluidly separate the vent port from the servo port when pressure differential between the vent port and the servo port exceeds a predetermined value.

In accordance with certain embodiments, a guide tube can be fixed to the manifold. The poppet can be slideably received about the guide tube. The guide tube can define a guide tube channel and one or more guide tube orifices, the one or more guide tube orifices extending through the guide tube and fluidly coupling the guide tube channel with the servo port. The guide tube can extend about the longitudinal axis of the valve body. The guide tube can define an axial slot. The axial slot can be radially offset from the longitudinal axis of the valve body. The axial slot can extend axially along a portion of the length of the guide tube. The axial slot can be defined within an exterior surface of the guide tube. In the closed position, the poppet passage can axially overlap the axial slot of the guide tube. In the open position, the poppet passage can be axially offset from the axial slot of the guide tube.

It is also contemplated that, in accordance with certain embodiments, the poppet and the manifold can define between one another a vent chamber. The vent chamber can be in fluid communication with the servo port when the poppet is in the closed position. An end cap can be disposed between the poppet seat and the manifold. The end cap and the poppet can define between one another a servo chamber. The servo chamber can be in fluid communication with the vent port when the poppet is in the closed position. An outer seal ring can extend about the poppet between the poppet and the end cap. An inner seal ring can extend about the poppet between the poppet and the manifold.

An in-line shutoff valve arrangement includes an in-line shutoff valve as describe above. The poppet has a poppet passage to couple the servo port with the vent port according to position of the poppet. A vent fluid source is fluidly coupled to the vent port to provide pressurized fluid to the vent port at a pressure that is greater than ambient pressure. A servo fluid source can be fluidly coupled to the servo port to provide pressurized fluid to the servo port with a pressure greater than that provided to the vent port by the vent fluid source.

A method of cooling an in-line shutoff valve includes moving a poppet disposed within the in-line shutoff valve to a closed position, fluidly connecting the vent port with a servo port, and flowing fluid from the vent port to the servo port through an interior of the in-line shutoff valve. The poppet can be moved from the open position, the vent port fluidly separated from the servo port, and the poppet moved to the closed position.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
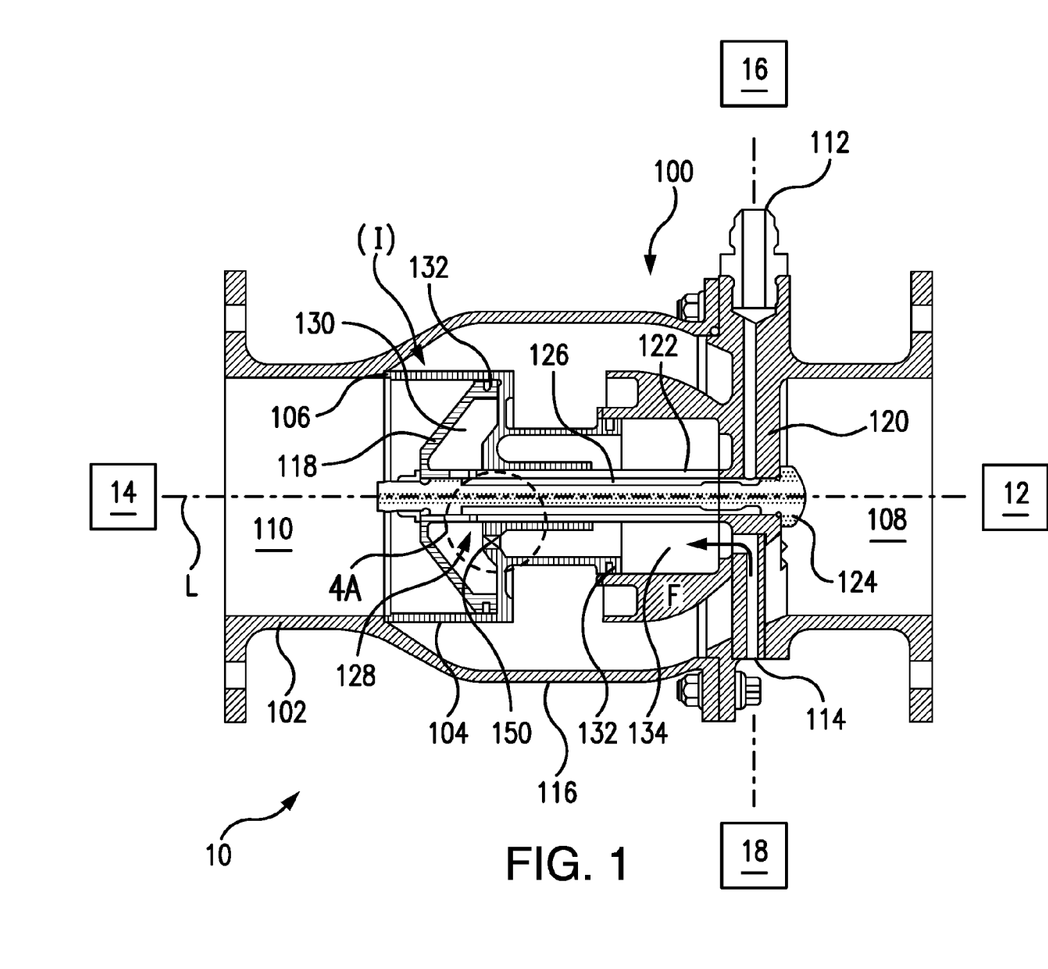
FIG. 1 is a cross-sectional side view of an exemplary embodiment of an in-line shutoff valve arrangement constructed in accordance with the present disclosure, showing a servo fluid source and a vent fluid source fluidly coupled to an in-line shutoff valve.

Reference will now be made to the drawings wherein like reference numerals identify similar structural features or aspects of the subject disclosure. For purposes of explanation and illustration, and not limitation, a partial view of an exemplary embodiment of an in-line shutoff valve arrangement in accordance with the disclosure is shown in FIG. 1 and is designated generally by reference character 10. Other embodiments of in-line shutoff valve arrangements, in-line shutoff valves, and methods of cooling in-line shutoff valves in accordance with the disclosure, or aspects thereof, are provided in FIGS. 2-6, as will be described. The in-line shutoff valve arrangements, in-line shutoff valves, and methods of cooling in-line shutoff valves described herein can be in gas turbine engine compressor bleed arrangements, though the present disclosure is not limited to compressor bleed arrangements or to gas turbine engines in general.

Referring to FIG. 1, in-line shutoff valve arrangement 10 is shown. In-line shutoff valve arrangement 10 includes an in-line shutoff valve 100, a fluid source 12, a fluid destination 14, a servo fluid source 16, and a vent fluid source 18. Fluid source 12 can be a hot gas source, such as a compressor section of a gas turbine engine, and is in selective fluid communication with fluid destination 14 through in-line shutoff valve 100. Fluid destination 14 can be a hot gas destination, such as an environmental control system or a de-ice system for an aircraft, and selectively receives fluid from fluid source 12.

Servo fluid source 16 includes a source of pressurized fluid configured to selectively flow pressurized servo fluid to in-line shutoff valve 100. Vent fluid source 18 includes a supply of pressurized coolant. In certain embodiments vent fluid source 18 constantly applies a coolant fluid to in-line shutoff valve 100 at a temperature that is lower than that of fluid available from fluid source 12 and at a pressure that is greater than ambient pressure. It is also contemplated that servo fluid source 16 be configured to intermittently flow pressurized servo fluid to in-line shutoff valve 100 with a pressure that is greater than that of pressurized coolant fluid provided by vent fluid source 18, e.g., according to operational need to fluidly couple fluid source 12 with fluid destination 14.

In-line shutoff valve 100 includes a valve body 102. Valve body 102 defines a longitudinal axis L and has within its interior an inlet chamber 108 and an outlet chamber 110. Inlet chamber 108 is disposed on a longitudinally opposite end of valve body 102 relative to outlet chamber 110. Fluid source 12 is in fluid communication with inlet chamber 108 of in-line shutoff valve 100. Fluid destination 14 is in fluid communication with outlet chamber 110 of in-line shutoff valve 100. Valve body 102 also has a servo port 112 and a vent port 114 defined on an exterior 116 of valve body 102.

In the illustrated exemplary embodiment, servo fluid source 16 is in selective fluid communication with servo port 112 and vent fluid source 18 is in continuous fluid communication with vent port 114. Servo fluid source 16 is configured and adapted to apply a servo pressure $P_S$ at servo port 112. Vent fluid source 18 is configured and adapted to apply a vent pressure $P_V$ at vent port 114. In embodiments, servo pressure $P_S$ is greater than vent pressure $P_V$ when present. In certain embodiments, vent pressure $P_V$ is substantially constant.

Valve body 102 has within its interior a poppet 104, a poppet seat 106, an end cap 118, a manifold 120, a guide tube 122, and retaining pin 124. Poppet seat 106 is axially adjacent to outlet chamber 110. Manifold 120 is axially adjacent to inlet chamber 108 and defines servo port 112 and vent port 114. End cap 118 is disposed axially between poppet seat 106 and manifold 120. Guide tube 122 is disposed between end cap 118 and manifold 120 and extends axially along longitudinal axis L between end cap 118 and manifold 120. Guide tube 122 defines within its interior a guide tube passage 126 and has one or more guide tube orifices 128 extending radially outward relative to longitudinal axis L through a wall of guide tube 122. Retaining pin 124 extends axially along longitudinal axis L, within guide tube passage 126, and between manifold 120 and end cap 118 to fix end cap 118 to manifold 120.

Poppet 104 is slideably seated over guide tube 122 and is movable between end cap 118 and manifold 120 along longitudinal axis L. On an upstream end (i.e. adjacent to outlet chamber 110), poppet 104 and end cap 118 define between one another a servo chamber 130. Servo chamber 130 is in fluid communication with servo port 112 through the one or more guide tube orifices 128 and guide tube channel 126. An outer seal ring 132 is disposed about radially abutting surfaces of poppet 104 and end cap 118, thereby providing sealing between poppet 104 and end cap 118. On a downstream end (i.e. adjacent to inlet chamber 108), poppet 104 and manifold 120 define between one another a vent chamber 134. Vent chamber 134 is in fluid communication vent port 114 and is in selective fluid communication with servo port 112 according to position of poppet 104, as will be further described below. An inner seal ring 136 being disposed between poppet 104 and manifold 120, thereby providing sealing between poppet 104 and manifold 120.

Servo port 112 is in fluid communication with guide tube passage 126 through manifold 120. Guide tube passage 126 is in fluid communication with servo chamber 130 through the one or more guide tube orifice 128 defined on an end of guide tube 122 disposed within servo chamber 130. Accordingly, when servo fluid source 16 applies fluid pressure at servo port 112 that is greater than pressure applied at vent port 114 by vent fluid source 18, a servo fluid flow $F_S$ (shown in FIG. 2) fluid flows into servo chamber 130. Servo fluid flow $F_S$ exerts force on poppet 104 from within servo chamber 130 which, from a closed position I (shown in FIG. 1), unseats poppet 104 from poppet seat 106. Continuing accumulation of fluid within servo chamber 130 thereafter drives the unseated poppet 104 along longitudinal axis L such that poppet 104 reaches open position II (shown in FIG. 2), wherein poppet is displaced from poppet seat 106 and abuts manifold 120.

Vent port 114 is in fluid communication with vent chamber 134 through manifold 120. A poppet passage 150 (illustrated schematically in FIG. 1) extends through poppet 104 between vent chamber 134 and servo chamber 130. Poppet passage 150 is configured and adapted to fluidly connect to selectively place vent chamber 134 in fluid communication with servo chamber 130 according to the position of poppet 104. In certain embodiments, poppet passage 150 fluidly couples vent chamber 134 with servo chamber 130 when poppet 104 is in closed position I (illustrated in FIG. 3). In this respect, when poppet 104 is in the closed position I, vent chamber 134 is in fluid communication with servo chamber 130 through poppet passage 150. Fluid communication between vent chamber 134 and servo chamber 130 allows fluid to flow from vent port 114 to servo port 112 when pressure applied at vent port 114 by vent fluid source 18 exceeds that of pressure at servo port 112. As will be appreciated by those of skill in the art in view of the present disclosure, when the vent fluid is cooler than the internal structures of in-line shutoff valve 100, e.g., end cap 118, poppet 104, guide tube 122, retaining pin 124, and/or manifold 120, the fluid flow forms a conduction path for removing heat therefrom, enabling the removal of heat from interior structures within valve body 102. In accordance with certain embodiments, poppet passage 150 fluidly separates vent chamber 134 from servo chamber 130 when poppet 104 is not in closed position I, such as when poppet 104 is in open position II (shown in FIG. 2) or between closed position I and open position II.

Figure 2:
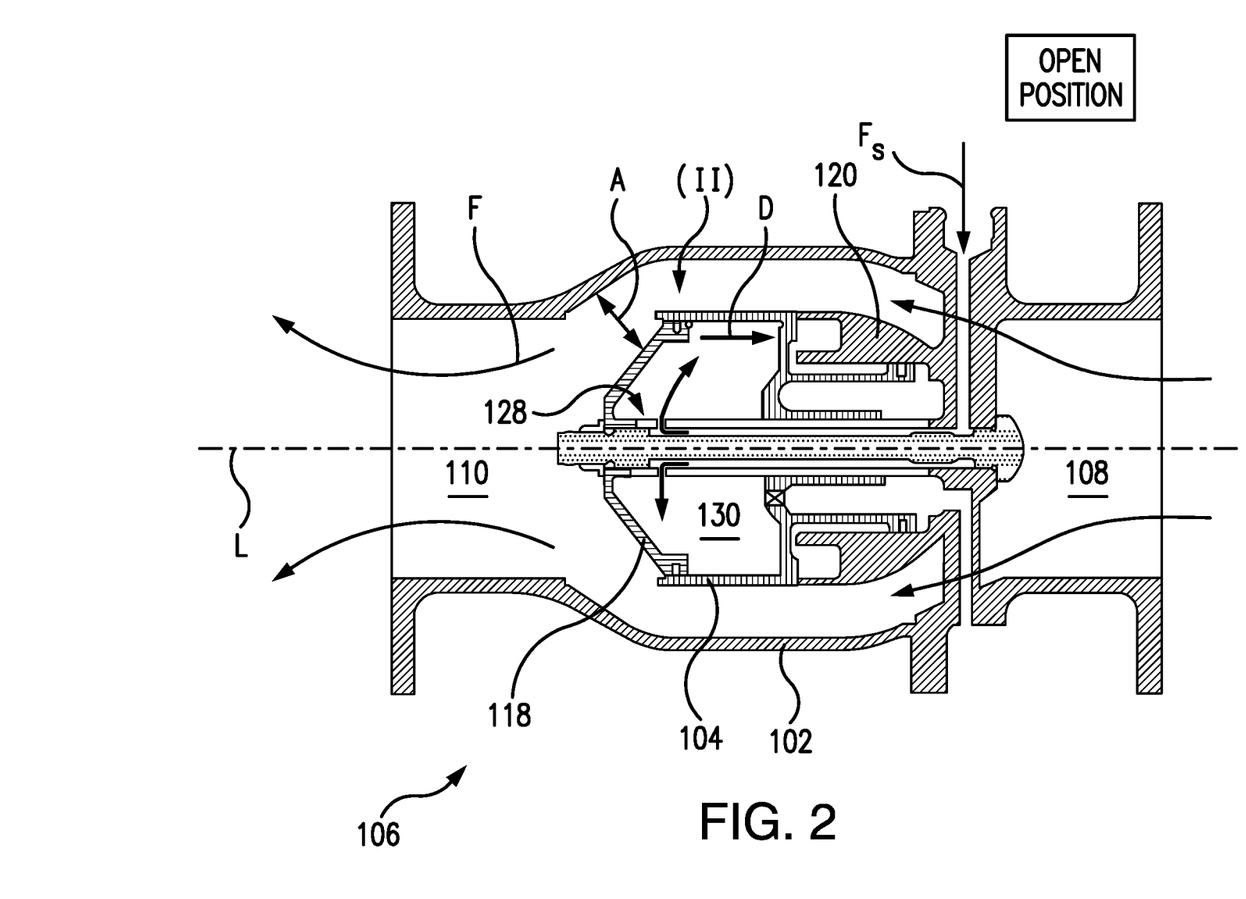
FIG. 2 is a cross-sectional side view of the in-line shutoff valve of FIG. 1, showing a poppet of the in-line shutoff valve in an open position.

Referring to FIG. 2, poppet 104 is shown in open position II. From closed position I (shown in FIG. 1), application servo pressure $P_V$ (shown in FIG. 1) at servo port 112 greater than vent pressure $P_V$ (shown in FIG. 1) applied at vent port 114 induces a causes servo fluid flow $F_S$ at servo port 112. Servo fluid flow $F_S$ traverses manifold 120 and guide tube channel 126, and enters servo chamber 130 through the one or more guide tube orifices 128. Entry of servo fluid flow $F_S$ into servo chamber 130 applies a drive force D to poppet 104. Drive force D is directed against poppet 104 and towards manifold 120, and unseats poppet 104 from poppet seat 106. Unseating poppet 104 from poppet seat 106 establishes annular flow area A, which places inlet chamber 108 in fluid communication with outlet chamber 110 such that fluid F flows from inlet chamber 108 to outlet chamber 110. Accumulation of servo fluid flow $F_S$ within servo chamber 130 displaces poppet 104 along longitudinal axis L, towards manifold 120, until poppet 104 reaches open position II, wherein poppet 104 abuts manifold 120.

When pressure at servo port 112 drops below pressure at vent port 114, servo fluid flow $F_S$ ceases. Cessation of servo fluid flow $F_S$ reduces (or removes entirely) drive force D from poppet 104. Removal of drive force D allows poppet 104 to translate along longitudinal axis L and toward end cap 118 relative to manifold 120, for example, from fluid flow F traversing the exterior surface of poppet 104 between inlet chamber 108 and outlet chamber 110 and/or through operation of a biasing element (not shown for reasons of clarity). Notably, no fluid communication occurs through poppet passage 150 when poppet 104 is in the open position. In certain embodiments, substantially no fluid communication occurs through poppet passage 150 when poppet 104 is unseated from poppet seat 106.

Figure 3:
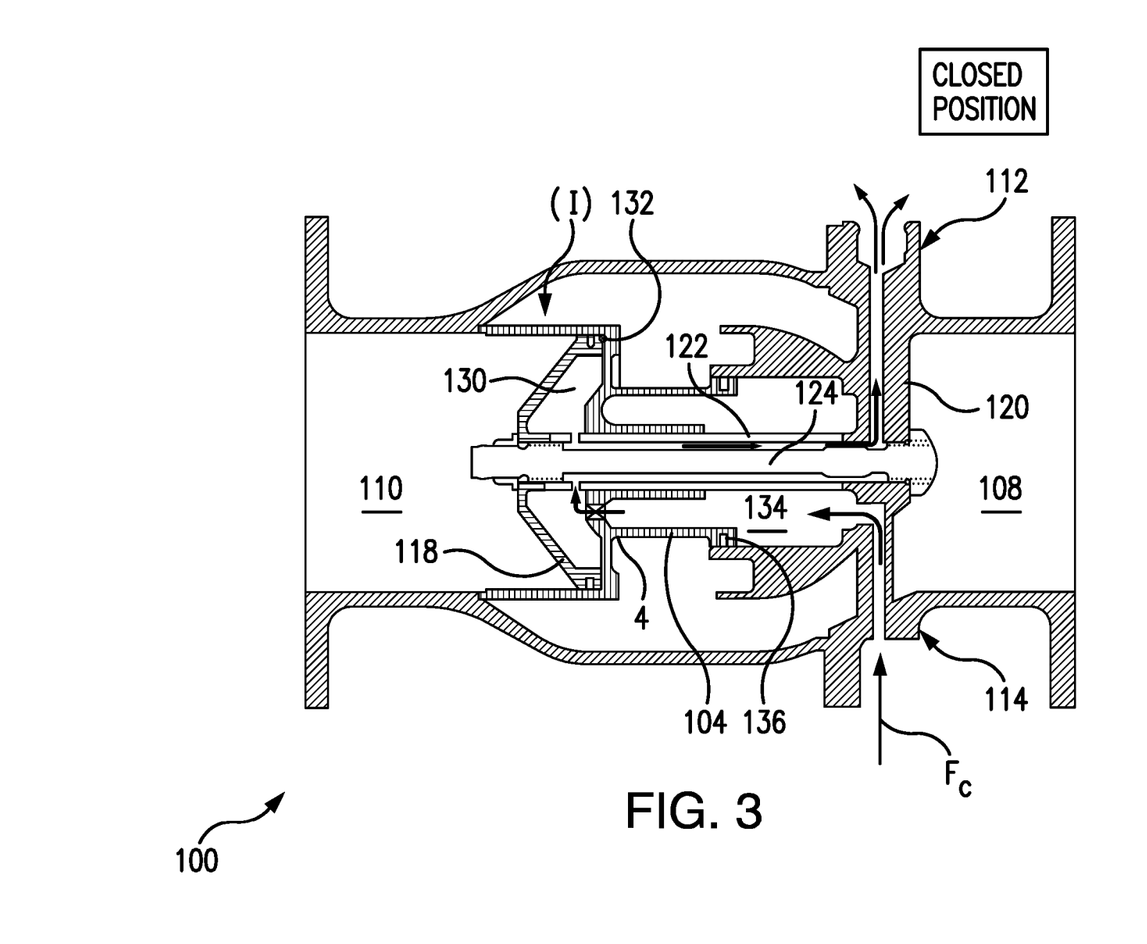
FIG. 3 is cross-sectional side view of the in-line shutoff valve of FIG. 1, showing the poppet of the in-line shutoff valve in a closed position.

Referring to FIG. 3, poppet 104 is shown in closed position II. As will be appreciated by those of skill in the art in view of the present disclosure, leakage of relatively hot fluid resident within inlet chamber 108 can enter various structures within valve body 102. For example, small amounts of fluid from inlet chamber 108 may traverse outer seal ring 132 and enter servo chamber 130. Small amounts of fluid may also traverse inner seal ring 136 and enter vent chamber 134. If hot, the fluid can increase temperatures of internal structures within valve body 102, potentially raising the structure temperatures where materials forming internal structures exhibit material property changes. Such material property changes may influence the reliability of in-line shutoff valve 100. As a countermeasure, vent fluid flow $F_V$ in-line shutoff valve arrangement 10 (shown in FIG. 1) includes internal cooling. In this respect, in-line shutoff valve arrangement 10 includes vent fluid source 18.

In particular, when poppet 104 is in closed position II, poppet passage 150 fluidly couples vent chamber 134 with servo chamber 130. Fluidly coupling vent chamber 134 with servo chamber 130 places vent port 114 in fluid communication with servo port 112. As a consequence, when pressure at vent port 114 exceeds pressure at servo port 112, vent fluid flow $F_V$ enters manifold 120 from vent port 114. From manifold 120 vent fluid flow $F_V$ enters vent chamber 134 and flows into servo chamber 130 through poppet passage 150. From servo chamber 130, vent fluid flow $F_V$ enters guide tube passage 126 through the one or more guide tube orifices 128, flows axially along the length of guide tube 122 to manifold 120, thereafter exiting valve body 102 through servo port 112. It is contemplated that vent fluid flow $F_V$ have a temperature that is lower than that of gas source 12 (shown in FIG. 1), vent fluid flow $F_V$ thereby transferring heat from internal structures within valve body 102, e.g., end cap 118, poppet 104, guide tube 122, retaining pin 124, and/or manifold 120. This allows for maintaining the temperature of one or more of the internal structures below a temperature at which the material properties of the material begin to change, potentially improving the reliability of in-line shutoff valve 100.

Figure 4A:
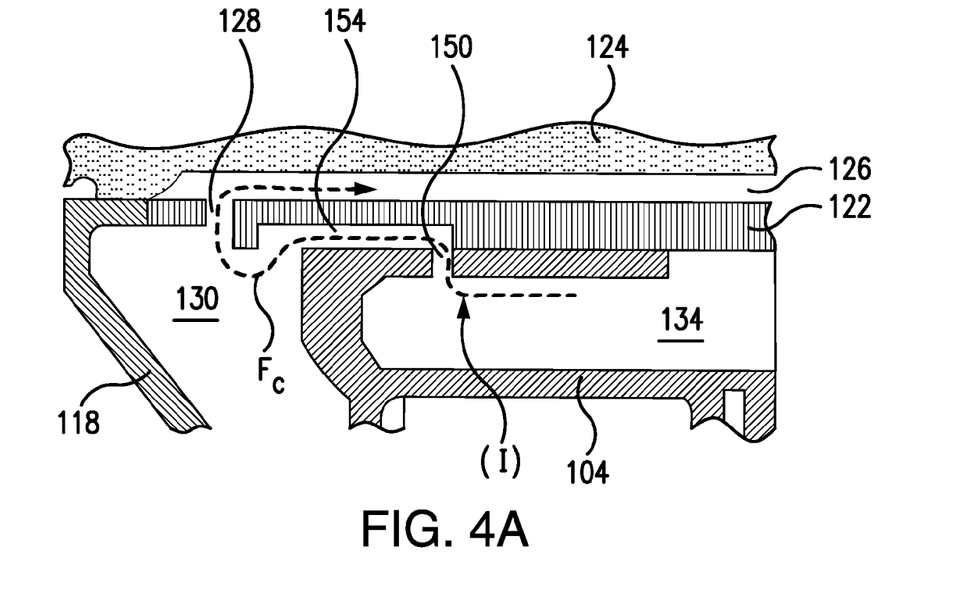
FIGS. 4A and 4B are a cross-section side view of the in-line shutoff valve of FIG. 1, showing fluid flowing through a poppet passage to cool internal structures of the in-line shutoff valve while the poppet is in the closed position, according to an embodiment.
Figure 4B:
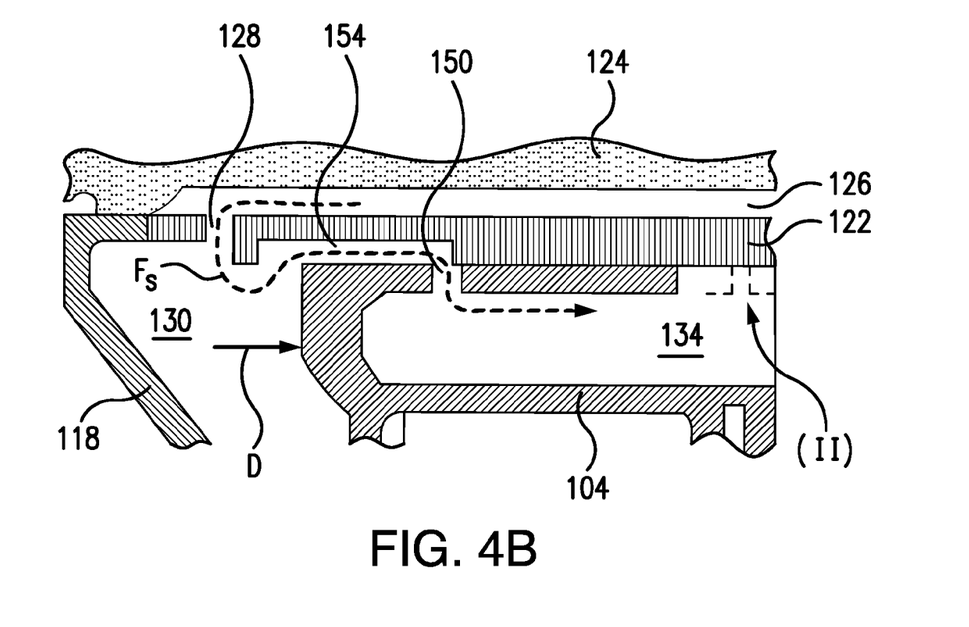

Referring to FIGS. 4A and 4B, poppet passage 150 is shown. In the illustrated exemplary embodiment, poppet passage 150 extends radially through poppet 104 from vent chamber 134 and towards guide tube 122 (i.e. towards longitudinal axis L). Guide tube 122 defines an axial slot 154 that extends along an axial segment of the guide tube 122 and is in fluid communication with servo chamber 130. Axial slot 154 is bounded by an exterior surface of guide tube 122 and is disposed on a side of guide tube 122 that is radially opposite guide tube channel 126 relative to a wall of guide tube 122.

With reference to FIG. 4A, when poppet 104 is in closed position I, poppet passage 150 axially overlaps axial slot 154 such that poppet passage 150 is in fluid communication with axial slot 154. Fluid communication of poppet passage 150 and axial slot 154 places vent chamber 134 in fluid communication with servo chamber 130, allowing vent fluid flow $F_V$ to traverse poppet passage 150 between vent chamber 134 and servo chamber 130.

With reference to FIG. 4B, entry of servo fluid flow $F_S$ into servo chamber 130 generates drive force D, which unseats poppet 104 from poppet seat 106 (shown in FIG. 1). Unseating poppet 104 reduces the amount of axial overlap between poppet passage 150 and axial slot 154, reducing the effective flow area through poppet passage 150. It is contemplated that poppet passage 150 have a flow area sized such that servo fluid flow $F_S$ through the one or more guide tube orifices 128 exceed that of fluid flow through poppet passage 150 irrespective of the position of poppet 104. As will be appreciated by those of skill in the art in view of the present disclosure, continued application of drive force D displaces poppet to closed position II, wherein poppet passage 150 is fluidly separated from axial slot 154 by guide tube 122.

Figure 5:
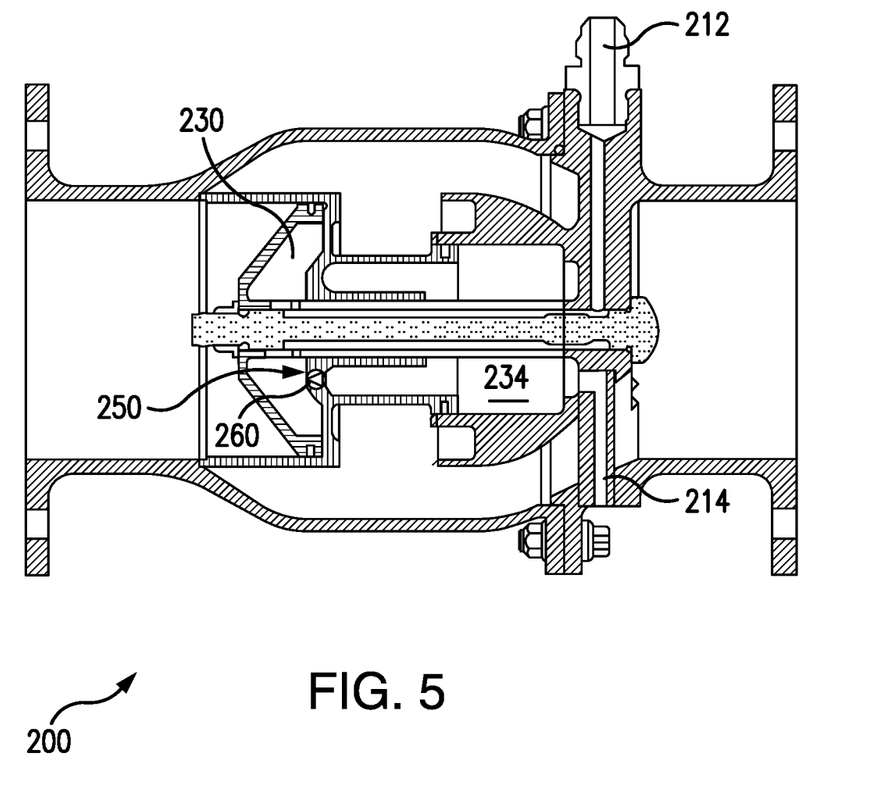
FIG. 5 is a cross-section side view of the bleed valve of FIG. 1, showing fluid flowing through a check valve seated in the poppet passage to cool internal structures of the in-line shutoff valve while the poppet is in the closed position, according to another embodiment while in the closed position.

With reference to FIG. 5, an in-line shutoff valve 200 is shown. In-line shutoff valve 200 is similar to in-line shutoff valve 100 (shown in FIG. 1) and additionally includes an aperture 250 having a check valve 260 seated therein. Check valve 260 is configured and adapted to shut when pressure at servo port 212, and pressure within servo chamber 230, exceeds pressure at vent port 214, and pressure within vent chamber 234. As will be appreciated by those of skill in the art in view of the present disclosure, check valve 260 enables servo chamber 230 to pressurize more rapidly upon application of pressurized servo fluid, e.g., servo fluid $F_S$ (shown in FIG. 2) than were servo chamber 230 and vent chamber 234 connected by an open poppet passage. Relatively rapid pressurization of servo chamber 230 provided by check valve 260 allows in-line shutoff valve 200 to be activated at a given upstream pressure with a relative low servo fluid pressure. As will also be appreciated by those of skill in the art in view of the present disclosure, check valve 260 can enable the switching solenoid, e.g., servo fluid source 16 (shown in FIG. 1), to be relatively small and/or lightweight.

Figure 6:
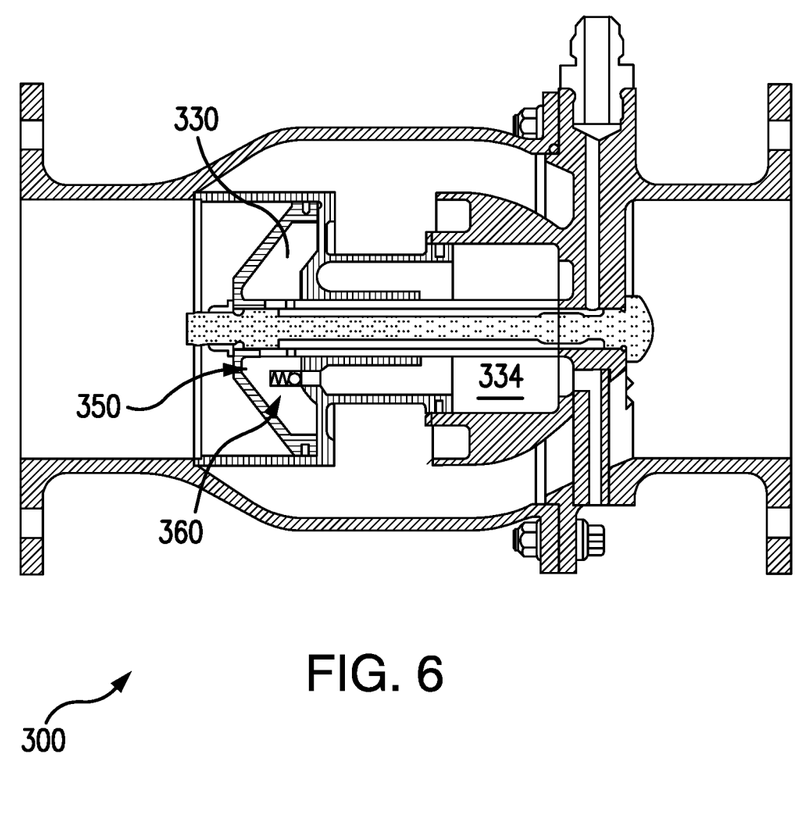
FIG. 6 is a cross-section side view of the bleed valve of FIG. 1, showing fluid flowing through a relief valve seated in the poppet passage to cool internal structures of the in-line shutoff valve while the poppet is in the closed position, according to yet another embodiment.

With reference to FIG. 6, an in-line shutoff valve 300 is shown. In-line shutoff valve 300 is similar to in-line shutoff valve 100 (shown in FIG. 1), and additionally includes an aperture 350 having a relief valve seated therein. Relief valve 360 enables aperture 350 to fluidly connect vent chamber 334 with servo chamber 330 only at the highest inlet chamber temperatures and pressures, thereby limiting the use of internal cooling when the pressure difference between vent chamber 336 and ambient pressure in servo chamber 330 reaches a predetermined pressure value. In embodiments, it is contemplated that the predetermined pressure value can correspond to valve inlet pressures and temperatures where cooling of internal components is advantageous. As will be appreciated by those of skill in the art in view of the present disclosure, relief valve 360 enables servo chamber 330 to pressurize more rapidly upon application of pressurized servo fluid, e.g., servo fluid $F_S$ (shown in FIG. 2) than were servo chamber 330 and vent chamber 334 connected by an open poppet passage. Relatively rapid pressurization of servo chamber 330 provided by relief valve 360 allows in-line shutoff valve 300 to be activated at a given upstream pressure with a relative low servo fluid pressure.

A method of cooling an in-line shutoff valve, e.g., in-line shutoff valve 100 (shown in FIG. 1), includes receiving a coolant flow at a vent port, e.g., vent port 114 (shown in FIG. 1). The vent port is fluidly connected with a servo port, e.g., servo port 112 (shown in FIG. 1) by moving a poppet, e.g., poppet 104 (shown in FIG. 1) to a closed position. Coolant is flowed from the vent port to the servo port through the interior of the in-line shutoff valve to cool internal structure of the in-line shutoff valve. In certain embodiments, the method can include fluidly separating the vent port from the servo port by moving the poppet to an open position.

The methods and systems of the present disclosure, as described above and shown in the drawings, provide for in-line shutoff valve arrangements, in-line shutoff valves, and methods of cooling in-line shutoff valves with superior properties including reduced internal structure temperature, potentially reducing the size and weight of in-line shut off valves for gas turbine engines. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. An in-line shutoff valve, comprising:
   a valve body having an inlet chamber, an outlet chamber, and a poppet seat disposed between the inlet chamber and the outlet chamber;
   a poppet movably disposed within the valve body and defining a closed position and an open position of the in-line shutoff valve,
   wherein the poppet is seated against the poppet seat in the closed position such that the inlet chamber is fluidly separated from the outlet chamber,
   wherein the poppet is displaced from the poppet seat in the open position such that the inlet chamber is in fluid communication with the outlet chamber; and
   a manifold disposed within the valve body between the poppet and the outlet chamber and having a servo port and a vent port, wherein the vent port is in fluid communication with the servo port when the poppet is in the closed position to flow fluid from the vent port to the servo port through the valve body to cool the in-line shutoff valve,
   wherein the poppet has a poppet passage configured to selectively couple the servo port with the vent port according to position of the poppet.

2. The in-line shutoff valve as recited in claim 1, wherein the poppet extends about a longitudinal axis of the valve body, the poppet passage extending radially through the poppet relative to the longitudinal axis.

3. The in-line shutoff valve as recited in claim 1, further comprising a check valve seated in the poppet passage and arranged to fluidly separate the vent port from the servo port when pressure at the servo port exceeds pressure at the vent port.

4. The in-line shutoff valve as recited in claim 1, further comprising a relief valve seated in the poppet passage and arranged to fluidly separate the vent port from the servo port when pressure differential between the vent port and the servo port exceeds a predetermined value.

5. The in-line shutoff valve as recited in claim 1, further comprising a guide tube fixed to the manifold, the poppet being slideably received about the guide tube.

6. The in-line shutoff valve as recited in claim 5, wherein the guide tube extends about a longitudinal axis of the valve body and defines an axial slot, wherein the axial slot is radially offset from the longitudinal axis and extends axially along the guide tube.

7. The in-line shutoff valve as recited in claim 5, wherein the guide tube defines a guide tube channel and an orifice extending through the guide tube, the orifice fluidly coupling the guide tube channel with the servo port.

8. The in-line shutoff valve as recited in claim 1, further comprising an inner seal ring extending about the poppet and disposed between the poppet and the manifold.

9. The in-line shutoff valve as recited in claim 1, wherein the poppet and the manifold define therebetween a vent chamber, the vent chamber being in fluid communication with the servo port when the poppet is in the closed position.

10. The in-line shutoff valve as recited in claim 1, further comprising an end cap disposed between the poppet seat and the manifold.

11. The in-line shutoff valve as recited in claim 10, wherein the end cap and the poppet define therebetween a servo chamber, the servo chamber being in fluid communication with the vent port when the poppet is in the closed position.

12. The in-line shutoff valve as recited in claim 10, further comprising an outer seal ring extending about the poppet and disposed between the poppet and the end cap.

13. An in-line shutoff valve arrangement, comprising:
an in-line shutoff valve, comprising:
    a valve body having an inlet chamber, an outlet chamber, and a poppet seat disposed between the inlet chamber and the outlet chamber;
    a poppet movably disposed within the valve body and defining a closed position and an open position of the in-line shutoff valve,
    wherein the poppet is seated against the poppet seat in the closed position such that the inlet chamber is fluidly separated from the outlet chamber,
    wherein the poppet is displaced from the poppet seat in the open position such that the inlet chamber is in fluid communication with the outlet chamber; and
    a manifold disposed within the valve body between the poppet and the outlet chamber and having a servo port and a vent port, wherein the vent port is in fluid communication with the servo port when the poppet is in the closed position to flow fluid from the vent port to the servo port through the valve body to cool the in-line shutoff valve,
    wherein the poppet has a poppet passage configured to selectively couple the servo port with the vent port according to position of the poppet; and
a vent fluid source coupled to the vent port configured and adapted to provide a pressurized fluid to the vent port at a pressure that is greater than ambient pressure.

14. The in-line shutoff valve arrangement as recited in claim 13, further comprising a servo fluid source fluidly coupled to the servo port, the servo fluid source configured and adapted to provide a pressurized fluid to the servo port with a pressure greater than pressure of the vent fluid source.

15. The in-line shutoff valve arrangement as recited in claim 13, wherein the poppet passage is configured to selectively couple the servo port with the vent port according to position of the poppet.

16. The in-line shutoff valve arrangement as recited in claim 13, further comprising a check valve seated in the poppet passage and arranged to fluidly separate the vent port from the servo port when pressure at the servo port exceeds pressure at the vent port.

17. The in-line shutoff valve arrangement as recited in claim 13, further comprising a relief valve seated in the poppet passage and arranged to fluidly separate the vent port from the servo port when a pressure differential between the vent port and the servo port exceeds a predetermined value.

18. A method of cooling an in-line shutoff valve, comprising:
    moving a poppet disposed within the in-line shutoff valve to a closed position;
    fluidly connecting a vent port with a servo port; and
    flowing a coolant fluid from the vent port to the servo port through an interior of the in-line shutoff valve, wherein flowing the fluid comprises flowing the fluid through a poppet passage defined within the poppet and configured to selectively couple the servo port with the vent port according to position of the poppet.

19. The method of cooling an in-line shutoff valve as recited in claim 18, further comprising:
    moving the poppet from the open position;
    fluidly separating the vent port from the servo port; and
    moving the poppet to the closed position.

* * * * *